United States Patent
Boortz et al.

(10) Patent No.: US 12,416,582 B2
(45) Date of Patent: Sep. 16, 2025

(54) PARTICULATE MATTER DETECTION DEVICE

(71) Applicant: Christopher Lee Boortz, Aurora, CO (US)

(72) Inventors: Christopher Lee Boortz, Aurora, CO (US); Jack Matthews, Aurora, CO (US); Shahbaz Hussain, Aurora, CO (US)

( * ) Notice: Subject to any disclaimer, the term of this patent is extended or adjusted under 35 U.S.C. 154(b) by 254 days.

(21) Appl. No.: 17/651,172

(22) PCT Filed: Aug. 19, 2020

(86) PCT No.: PCT/US2020/047005
§ 371 (c)(1),
(2) Date: Feb. 15, 2022

(87) PCT Pub. No.: WO2021/034937
PCT Pub. Date: Feb. 25, 2021

(65) Prior Publication Data
US 2023/0366831 A1  Nov. 16, 2023

Related U.S. Application Data

(60) Provisional application No. 62/888,808, filed on Aug. 19, 2019.

(51) Int. Cl.
*G01N 21/94* (2006.01)
*G01N 15/02* (2006.01)
(Continued)

(52) U.S. Cl.
CPC ......... *G01N 21/94* (2013.01); *G01N 15/0205* (2013.01); *G01N 15/0272* (2013.01); *G01N 15/0618* (2013.01)

(58) Field of Classification Search
CPC ............... G01N 21/94; G01N 15/0205; G01N 15/0272; G01N 15/0618; G01N 15/0612
See application file for complete search history.

(56) References Cited

U.S. PATENT DOCUMENTS 7,442,237 B1 * 10/2008 Gardner ................. A62B 23/02
55/DIG. 35
9,476,818 B1    10/2016 Martin et al.
(Continued)

FOREIGN PATENT DOCUMENTS

WO    2019-149330    8/2019

OTHER PUBLICATIONS

Haenssler, T., European Search Report for Patent Application No. 20855502.9, dated Jul. 18, 2023, European Patent Office.

*Primary Examiner* — Rebecca C Bryant
(74) *Attorney, Agent, or Firm* — Spencer Fane LLP

(57) ABSTRACT

A particulate matter detection device and methods for detecting a particulate matter in the environment. The particulate matter detection device comprising an indicator comprising a detection layer, an optical substance bonded to a detection layer surface, and a graphical target layer viewable through one or more apertures in the detection layer. The adsorption of particulate matter to the optical substance obscures the graphical target layer as viewed through the one or more apertures to indicate the presence of particulate matter. The indicator demountably connected to a support frame comprises a sealed membrane to protect the optical substance. A channeled air modifier forming an enclosure with the support frame discriminates particulate matter from adsorbing onto the optical substance.

16 Claims, 10 Drawing Sheets

(51) Int. Cl.
*G01N 15/0205* (2024.01)
*G01N 15/06* (2006.01)

(56) References Cited

U.S. PATENT DOCUMENTS

| | | |
|---|---|---|
| 11,235,182 B2 * | 2/2022 | Wang .................. A62B 23/025 |
| 2003/0067704 A1 | 4/2003 | Woo et al. |
| 2004/0083896 A1 | 5/2004 | Mihaylov et al. |
| 2009/0046364 A1 | 2/2009 | Wordhouse |
| 2009/0081804 A1 | 3/2009 | Tuchman |
| 2013/0011930 A1 | 1/2013 | Takegawa et al. |
| 2014/0091215 A1 | 4/2014 | Watanabe et al. |
| 2015/0008486 A1 | 1/2015 | Bryant et al. |
| 2018/0207569 A1 * | 7/2018 | Salpietra ............ B01D 46/0005 |

\* cited by examiner

PARTICULATE MATTER DETECTION DEVICE

CROSS-REFERENCE TO RELATED APPLICATIONS

This application claims priority to United States provisional Patent Application No. 62/888,808, filed Aug. 19, 2019, titled PARTICULATE MATTER DETECTION DEVICE, and Patent Cooperation Treaty Application No. PCT/US2020/047005 filed Aug. 19, 2020, titled SILICA MONITORING SENSOR which is hereby incorporated into the present application by reference in its entirety.

BACKGROUND

1. Field of the Disclosed Subject Matter

The disclosed subject matter generally relates to a particulate matter detection device for detecting exposure to particulate matter, and more particularly to a non-powered exposure indicator device for detecting inert particulate matter including aerosolized siliceous dust.

2. Background

Crystalline silica is an abundant and widespread mineral of silicon dioxide ($SiO_2$) commonly found in sand, stone, gravel, brick, and mortar. When these or other materials containing crystalline silica are cut, ground, crushed, or abraded, dust containing breathable (or, "respirable") particles of crystalline silica may be formed. These particles easily travel deep into the lungs, where they become trapped and cause silicosis, lung cancer, and chronic obstructive pulmonary disease. To reduce the hazard posed by crystalline silica in the construction industry, the United States Occupational Safety and Health Administration (OSHA) has enacted regulations limiting individuals' exposure. The OSHA Respirable Crystalline Silica standard for construction requires employers to either: (1) follow control methods for construction activities likely to expose individuals to crystalline silica dust; or (2) measure individuals' exposure to silica and limit their exposure at or below the permissible exposure limit (PEL). Many construction businesses will be unable to fully meet the control method requirements owing to the prevalence of construction industry tasks that produce crystalline silica dust and the impracticability of the control methods. Accordingly, many construction businesses will be required to measure individuals' exposure to crystalline silica to determine if exposure (averaged over an eight-hour day) reaches the action level of 25 µg/m3 (micrograms of silica per cubic meter of air) or the PEL of 50 µg/m3.

Most current systems for monitoring crystalline silica exposure are expensive, large, and unsuitable to track the real exposure of individuals moving between normal activities at a construction site. A wearable exposure monitor could allow real exposure monitoring of an individual moving around the construction site, but current systems require electric power and cannot provide instant results. Instead, the results are not available until the sample is removed and analyzed, often by an off-site certified laboratory. Although some sample collection media are pre-weighed and provide for gravimetric analysis without shipment to an off-site laboratory, the collection media must still be removed and replaced to determine an individual's exposure to silica, even if the individual's exposure is far below the action level, the PEL, or the capacity of the sample collection media.

SUMMARY

In accordance with an aspect of the disclosed subject matter, a particulate matter detection device comprises an indicator including a detection layer, an optical substance bonded to the detection layer, and a graphical target layer. The detection layer comprising a detection layer surface and one or more apertures disposed through the detection layer surface. The optical substance is bonded to the detection surface, and the optical substance forms one or more optical windows bounded by the one or more apertures. The optical substance is configured to adsorb a particulate matter, such as silica dust, and obscure the graphical target layer as viewed through the one or more optical windows through the accumulation of the particulate matter on the optical surface. In an embodiment, the optical substance comprises a poly-siloxane gel, rubber, polymer, or resin having an affinity to a particulate matter.

In accordance with another aspect of the disclosed subject matter, the detection layer is a mesh layer and may comprise of strands to support the optical substance. In an embodiment, the detection layer is connected to a rim configured to demountably connect to a support frame. In another embodiment, the support connects to the detection layer by means of one or more first fasteners and further connects to an individual or attachment surface by means of one or more second fasteners. The detection layer may be demounted from the support frame for subsequent analysis of the optical substance.

In accordance with another aspect of the disclosed subject matter, a sealed membrane is demountably connected to the support frame, wherein the sealed membrane is configured to enclose the indicator within the support frame. The sealed membrane may be removed prior to detecting particulate matter.

In accordance with another aspect of the disclosed subject matter, a channeled air modifier is connected to the support frame. A top surface of the channeled air modifier is provided with a plurality of holes to discriminate particulate matter of a predetermined size from contacting the optical surface. In another aspect of the disclosed subject matter, a prescreen is connected between the plurality of holes and the indicator to further discriminate particulate matter of a particular size from contacting the optical surface.

In accordance with another aspect of the disclosed subject matter, the graphical target layer comprises a colored surface or a patterned surface viewable through the one or more optical windows. The accumulation of particulate matter on the optical substance obscures the graphical target layer, thus indicating an exposure of particulate matter.

In accordance with another aspect of the disclosed subject matter, a particulate matter detection device comprises an indicator comprising a detection layer having a detection layer surface and one or more apertures disposed through the detection layer surface. The indicator further comprising an optical substance bonded to the detection layer surface, the optical substance forming one or more optical windows bounded by the one or more apertures, the optical substance configured to adsorb a particulate matter. The indicator further comprising a graphical target layer viewable through the one or more optical windows, whereby adsorption of the particulate matter to the optical substance obscures the graphical target layer as viewed through the one or more optical windows. The particulate matter detection device further comprising a support frame comprising one or more first fasteners, wherein the indicator is demountably connected to the support frame by the one or more first fasteners; one or more second fasteners connected to the support frame; and a sealed membrane connected to the support frame, wherein the sealed membrane is configured to enclose the indicator within the support frame.

In accordance with another aspect of the disclosed subject matter, a rotary variable aperture member is provided to detect particulate matter. The rotary variable aperture member comprises: an adjustable aperture dial having a top surface; at least one variable width aperture disposed through the top surface, the at least one variable width aperture configured to correspond to a particle size of the particulate matter; an optical substance bonded to the top surface, the optical substance forming one or more optical windows bounded by the at least one variable width aperture, the optical substance configured to adsorb a particulate matter and occlude the at least one variable width aperture; and a lower planar member rotatably connected to the adjustable aperture dial, the lower planar member having a graphic visible through the at least one variable width aperture.

In accordance with another aspect of the disclosed subject matter, a method for detecting particulate matter includes the step of providing an indicator comprising: a detection layer comprising: a detection layer surface; and one or more apertures disposed through the detection layer surface; an optical substance bonded to the detection layer surface, the optical substance forming one or more optical windows bounded by the one or more apertures, the optical substance configured to adsorb a particulate matter; and a graphical target layer viewable through the one or more optical windows. The method further comprises the steps of adsorbing the particulate matter onto the optical substance; and obscuring the graphical target layer as viewed through the one or more optical windows. In an aspect of the disclosed subject matter, the method further comprises the steps of connecting the indicator to a support frame having a sealed membrane, and removing the sealed membrane from the support frame prior to the adsorbing step. The method may further includes the step of connecting the support frame to one of an individual or an attachment surface prior to the adsorbing step. The method may further comprises the step of disconnecting the indicator from the support frame after the adsorbing step.

BRIEF DESCRIPTION OF THE DRAWINGS

The subject matter will now be illustrated in more detail, but not limited, by reference to the specific embodiment shown in the accompanying drawings, with greater emphasis being placed on clarity rather than scale.

DETAILED DESCRIPTION

Figure 1:
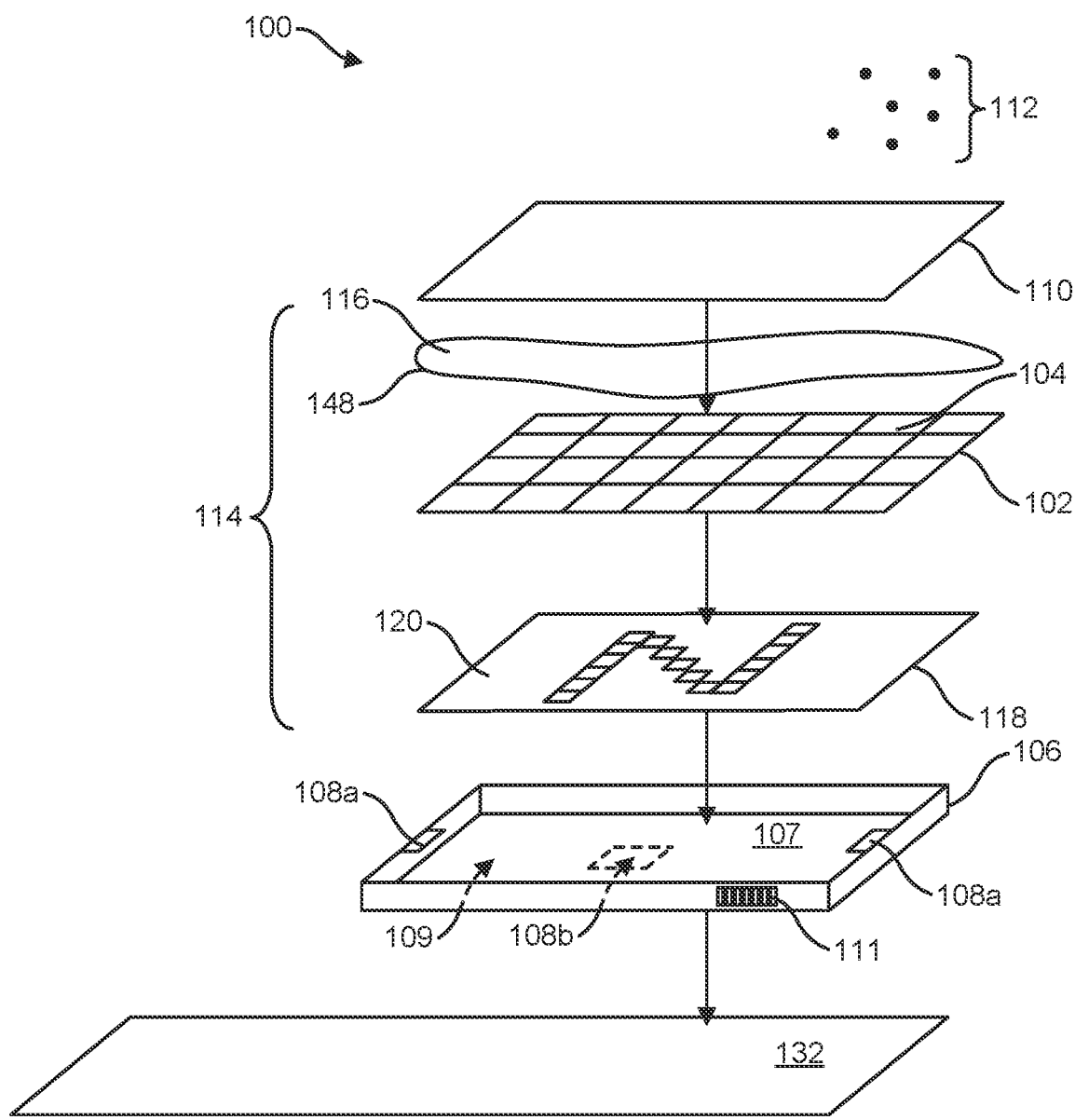
FIG. 1 is an exploded view of a particulate matter detection device according to an embodiment of the disclosed subject matter.

In the following description, and for the purposes of explanation, numerous specific details are set forth in order to provide a thorough understanding of the various aspects of the disclosed subject matter. It will be understood, however, by those skilled in the relevant arts, that embodiments of the disclosed subject matter may be practiced without these specific details. In other instances, known structures and devices are shown and/or discussed more generally in order to avoid obscuring the disclosed subject matter. In many cases, a description of the operation is sufficient to enable one of ordinary skill in the applicable art to implement the various forms of the disclosed subject matter. It should be appreciated that there are many different and alternative configurations, devices and technologies to which the disclosed subject matter may be applied. The full scope of the present disclosure is not limited to the examples described below.

In an embodiment of the disclosed subject matter, a particulate matter detection device 100 provides a continuous real-time visual indication of an individual's exposure to particulate matter, including respirable crystalline silica. Some embodiments of the particulate matter detection device comprise a disposable single-use indicator that may be worn by an individual to indicate the individual's exposure to particulate matter in the immediate vicinity of that individual. This individual, continuous, and real-time visual indication of particulate matter exposure provides employers and individuals with actionable insight to reduce particulate matter exposure generally, or specifically targeted to particular individuals, locations, shifts, tasks, materials, or other insights that may be gained by individualized continuous real-time monitoring of particulate matter exposure.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

Figure 2:
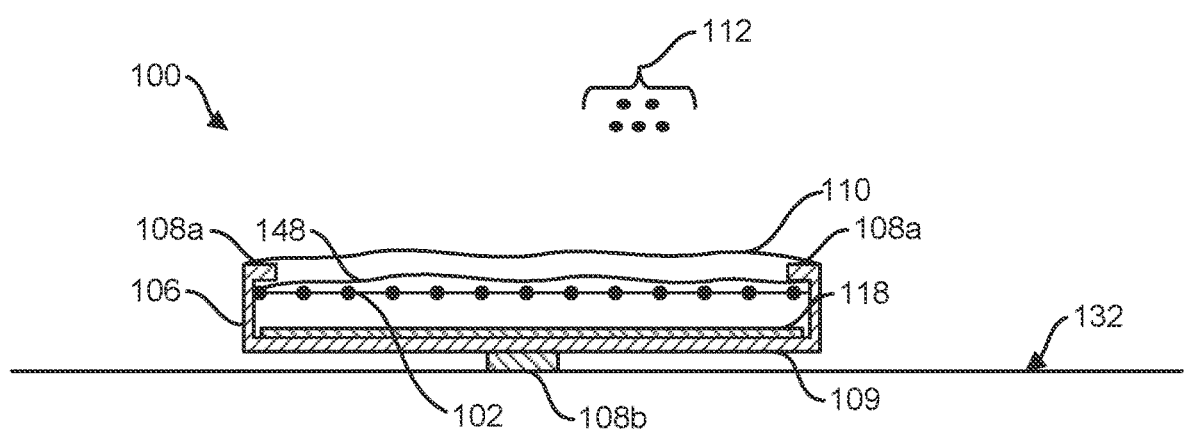
FIG. 2 is a cross-sectional view of a particulate matter detection device according to an embodiment of the disclosed subject matter.

Referring to FIGS. 1 and 2, in an embodiment of the disclosed subject matter, a particulate matter detection device 100 comprising an indicator 114 having a detection layer 102, an optical substance 148 disposed on a detection layer surface 104 of the detection layer 102, and graphical target layer 118 disposed below the detection layer 102. The indicator 114 is configured to attach to a support frame 106. In an embodiment, the support frame 106 comprises one or more first fasteners 108a, such a clips or clasps, in order to attach the indicator 114 to the support frame 106. The particulate matter detection device 100 may further comprise a sealed membrane 110 demountably connected to the support frame 106 in order to protect the indicator 114 prior to use from environmental contaminants such as moisture or silica dust. The sealed membrane 110 may be removed from the support frame 106 in order to expose the optical substance 148 to begin monitoring the environment for particulate matter 112 such as crystalline silica. As particulate matter 112 adsorbs onto a transparent surface 116 of the optical substance 148, a graphical target layer 118 disposed between the detection layer 102 and support frame 106 is obscured from view through the optical substance 148. The graphical target layer 118 may comprises a start pattern 120 formed within the graphical target layer 118 and/or printed with ink or other graphically representative material, i.e. film.

According to one embodiment, the indicator 114 held in a desired location by the support frame 106 comprising a support surface 107 sized and shaped to receive the indicator 114, which may be affixed thereon. In addition, the support frame 106 may fasten to an attachment surface 132 on or near an individual and secured in an orientation that provides a consistent interface between the detection layer 102 and the particulate matter 112 in the surrounding air environment. The support frame 106 may comprise one or more second fasteners 108b (such as, for example, clips, clasps, snaps, adhesives, or the like) which fastens the support frame 106 to an attachment surface 132. A back surface 109 of the support frame 106 may be fastened by one or more second fasteners 108b to the attachment surface 132. According to embodiments, the attachment surface 132 may comprise a location on or near an individual, such as, for example, the individual's clothing, headwear (such as, for example, hardhats, helmets, hats, and the like), a band attached on or near a particular body area of an individual (such as, for example, a tool belt, lanyard, armband, shoulder band, headband, wristband, or the like), a bag, backpack, or toolbox, a tool or equipment required to complete a task, or other like attachment surface. In another embodiment, the support frame may comprise a bar code 111 to provide historical tracking of the particulate matter detection device 100 and for use in a compliance database.

Figure 3:
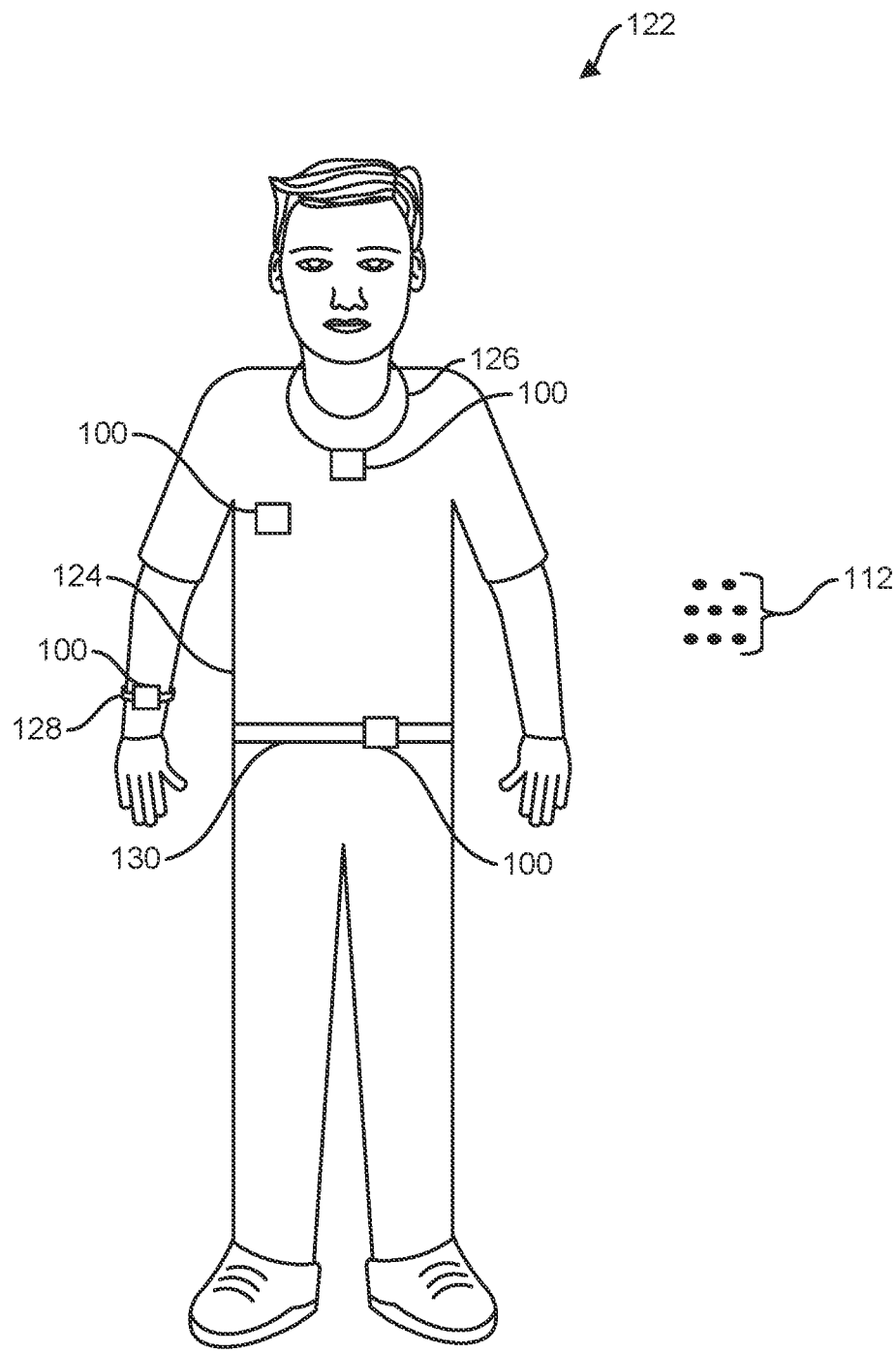
FIG. 3 is a perspective view of particulate detection device worn by an individual according to an embodiment of the disclosed subject matter.

Referring to FIG. 3, in an embodiment of the disclosed subject matter, the particulate matter detection device 100 may be worn by an individual 122 to determine exposure to particulate matter 112. For example, the particulate matter detection device 100 is attached to the exterior of the individual's clothing 124, or connected to the body of the individual 122 by attaching the particulate matter detection device 100 to a lanyard 126, wrist strap 128, or belt 130 worn by the individual 122. Other locations and means of attachment may be used to monitor the environment near the individual.

The detection layer 102 and optical substance 148 obscures the start pattern 120 to produce a visual indication of particulate matter 112 accumulated on the transparent surface 116 of the optical substance 148 since exposure of the optical substance 148 to ambient air. The design of the graphical target layer 118 and the optical substance 148 comprising various formulations of siloxane compounds produce optical and adsorption responses for various types of particle size categories, for example $PM_{2.5}$ (airborne particles or droplets that are 2.5 microns or less in width) or $PM_{10}$ (airborne particles or droplets that are 10 microns or less in width). In addition, an algorithm infers the amount of obfuscation that is relative to the reference PEL data. The algorithm output relates the personal exposure level of an individual since wearing the particulate matter detection device 100. This personal exposure level can be used by individuals, employees, and employers to take corrective measures to protect from over or near overexposure. In an embodiment of the disclosed subject matter, the detection layer 102 and optical substance 148 are precision manufactured having a consistent mass, and which may be used with gravimetric instruments to indicate exposure levels from industry accepted mass accumulation methods. For example, the detection layer 102 and optical substance 148 may comprises a predetermined collective first weight ($W_1$) before exposure of the optical substance 148 to the particulate matter 112. After exposure of the optical substance 148 to particulate matter 112, a collective second weight ($W_2$) of the detection layer 102 and optical substance 148 may be determined, and the difference between $W_2$ and $W_1$ corresponds to a cumulative exposure to the particulate matter 112 due to adsorption of the particulate matter 112 to the optical substance 148.

According to an embodiment, the optical substance 148 adsorbs the particulate matter 112, including, for example, inert airborne particulate matter, such as silica dust (including crystalline and non-crystalline silica), aluminosilicate dust, cellulose, and the like, calcium silicate, tricalciumalumino silicate, tricalciumsilicate, calcia, sodium silicates, sodium hydroxide, cerium oxide, beryllium oxide, calcium hydroxide, magnesium aluminate, magnesium silicate, sodium chlorate, fiber glass, asbestos, vermiculite, illite, diatomaceous earth, kaolin, zeolites, and the like. According to particular embodiments, the optical substance 148 collects particulate matter 112 classified as contributing to an increase in $PM_{2.5}$ and/or $PM_{10}$ concentrations.

Figure 4:
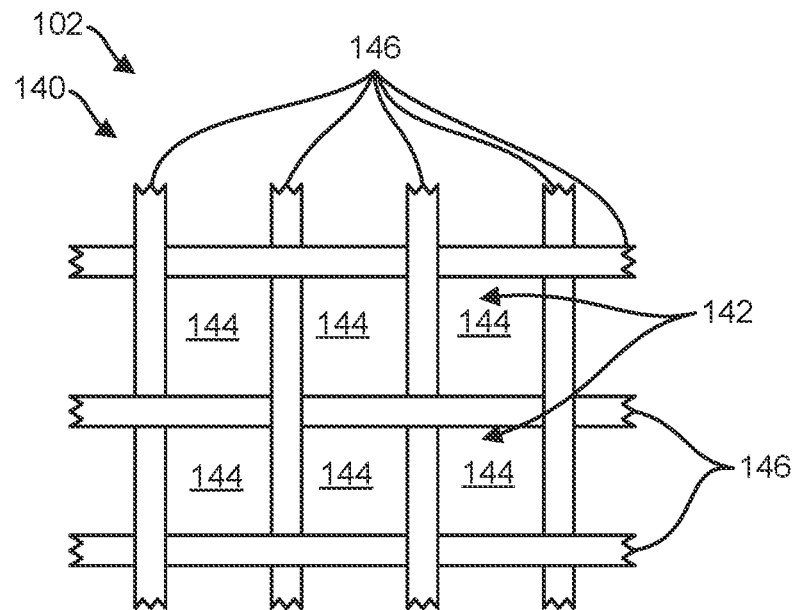
FIG. 4 is a top view of a detection layer according to an embodiment of the disclosed subject matter.
Figure 5:
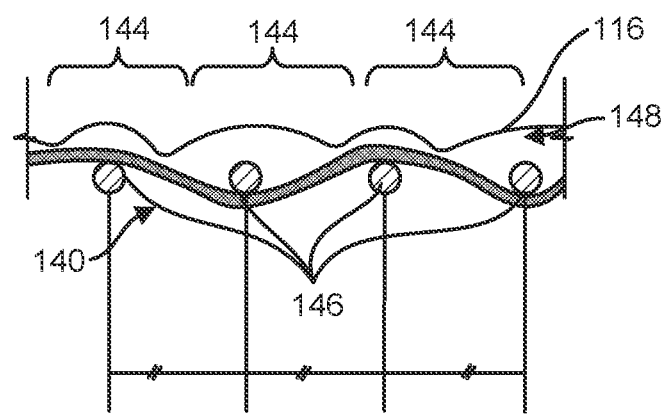
FIG. 5 is a cross-sectional view of a detection layer and indicator according to an embodiment of the disclosed subject matter.

Referring to FIG. 4 and FIG. 5, in an embodiment of the disclosed subject matter, the detection layer 102 comprises one or more apertures 142 disposed through the detection layer surface 104. In an embodiment of the disclosed subject matter, the detection layer 102 is a mesh layer 140. The optical substance is 148 (shown in FIG. 5) is bonded to the detection layer 102. The detection layer 102 provides structural integrity to the optical substance 148 bonded thereto. The optical substance 148 comprises a transparent or translucent substance that adsorbs the particulate matter 112 to the transparent surface 116. The one or more apertures 142, which, when covered, at least in part, by the optical substance 148, form one or more optical windows 144 bounded by the one or more apertures 142. For example, the detection layer 102 comprising the mesh layer 140 is coated with an optical substance 148 which forms one or more optical windows 144 bounded by the one or more apertures 142 by coating strands 146 of the mesh layer 140 and protruding from the perimeter of the one or apertures 142 in the mesh layer 140 towards the center of each of the one or more apertures 142.

According to some embodiments, the optical substance 148, adsorbs particulate matter 112 to its surface, may further engulf the particulate matter 112 within the volume of the optical substance 148. In response to adsorption, engulfment, or both of particulate matter 112, the optical substance 148 may transition from a substantially transparent substance to a substantially non-transparent substance having a visibly diminished optical clarity.

Figure 6A:
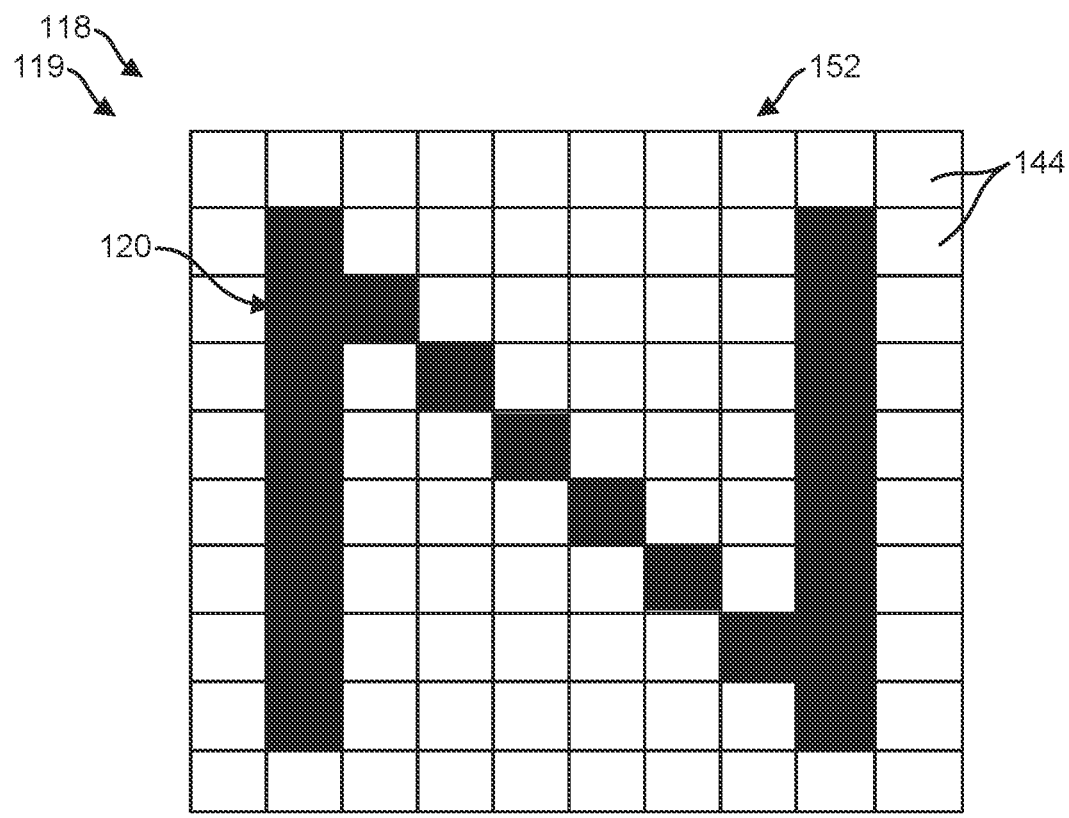
FIG. 6A is a top view of a start pattern of a graphical target layer according to an embodiment of the disclosed subject matter.
Figure 6B:
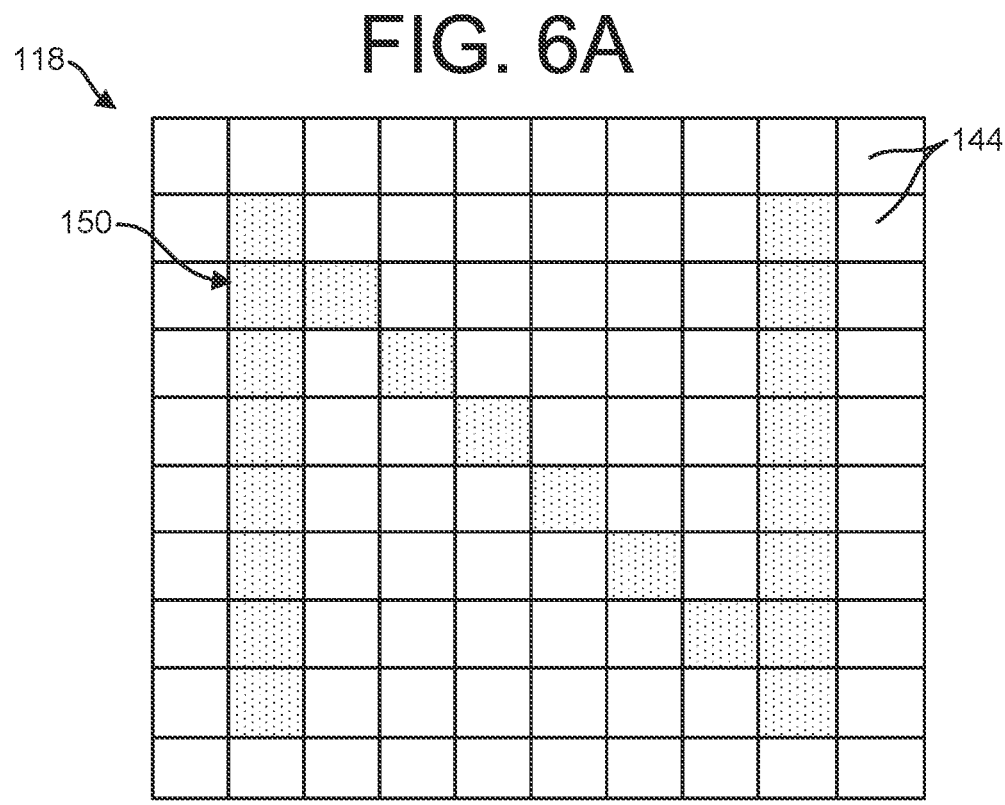
FIG. 6B is a top view of an obscured pattern of a graphical target layer according to an embodiment of the disclosed subject matter.

Referring to FIG. 6A and FIG. 6B, in an embodiment of the disclosed subject matter, a graphical target layer 118 comprises a grid pattern 152, such as a colored surface (not shown) or patterned surface 119. When particulate matter adsorbs to the optical substance 148, a visual appearance of the graphical target layer 118, when viewed through the one or more optical windows 144, changes a start pattern 120 (shown in FIG. 6A) to an obscured pattern 150 (shown in FIG. 6B) to indicate the presence of particulate matter by visually transforming or transfiguring the view of the graphical target layer 118. Adsorption of the particulate matter to the optical substance obscures the graphical target layer 118 as viewed through the one or more optical windows 144. For example, the graphical target layer 118 may comprise start pattern 120 in the form a light green "N", formed on a grid pattern 152. When the particulate matter detection device 100 is assembled, each cell of the grid pattern 152 of the graphical target layer 118 aligns with the one or more optical windows 144 formed by the optical substance 148 bonded to the detection layer 102. When the clarity or opacity of the one or more optical windows 144 diminishes in response to adsorbing of particulate matter onto the transparent surface 116 of the optical substance 148, the start pattern 120 becomes visibly obscured by the particulate matter 112 adhered to the one or more optical windows 144 of the detection layer 102. The transparency of the one or more optical windows 144 becomes clouded by the adsorption of the particulate matter 112 to the indicator 114. According to an embodiment, the thickness of the one or more optical windows 144, it rheological properties, and the intensity and shade of the green "N" are selected so that when the "N" changes in appearance and eventually disappears, this transformation indicates a predetermined amount of individual exposure to particulate matter 112, including, for example, exposure to crystalline silica (averaged over an eight-hour day) that meets or exceeds the action level of 25 $\mu g/m^3$ (micrograms of silica per cubic meter of air) or the PEL of 50 $\mu g/m^3$.

Figure 7:
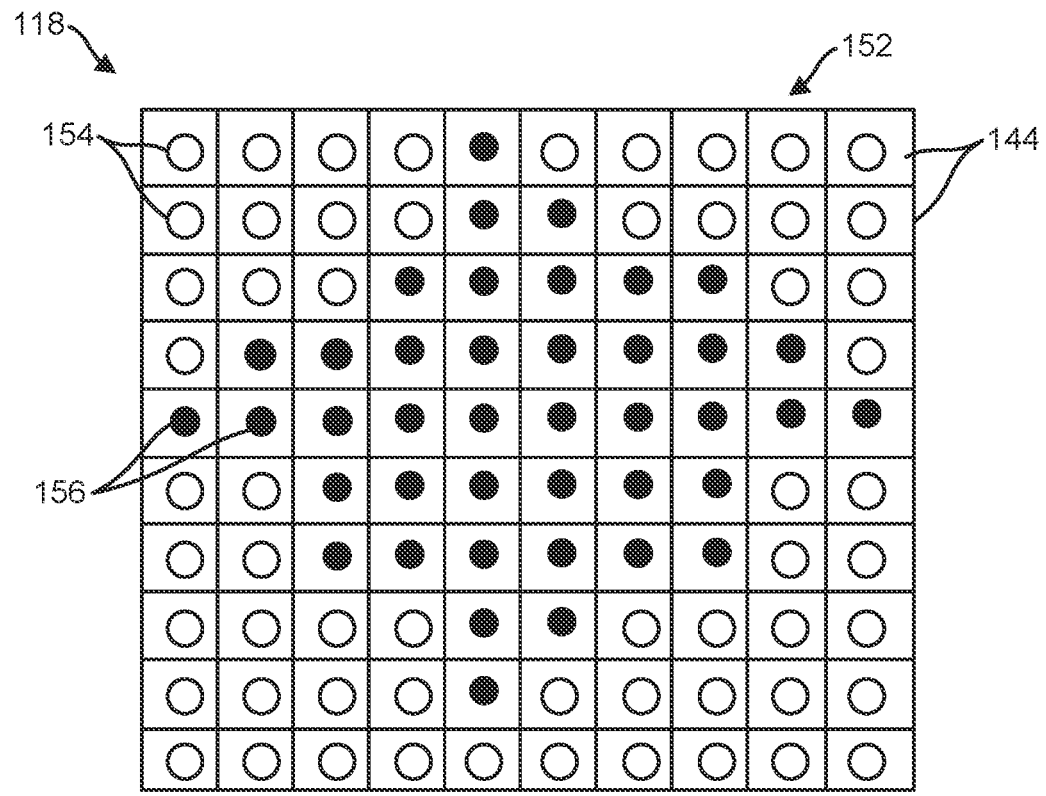
FIG. 7 is a top view of a graphical target layer according to an embodiment of the disclosed subject matter.

FIG. 7 illustrates another embodiment of a graphical target layer 118. As stated above, the altered visual appearance of the graphical target layer 118 indicates exposure of the optical substance 148 to particulate matter. In addition, embodiments contemplate the graphical target layer 118 providing quantification of the adsorbed particulate matter. In an embodiment of the disclosed subject matter, as the one or more optical windows 144 becomes obscured by particulate matter, the number of visible shapes 154 of the grid pattern 152 of the graphical target layer 118 indicates a gradation of exposure to particulate matter and is associated with a calculated quantity determined by testing for the relationship between a number of obscured shapes 156 and an amount and time of exposure. In addition, when a precision die is used to shape the detection layer 102 and a precision volume of the optical substance 148 is applied to the detection layer 102, the weight of the detection layer 102 and optical substance 148 is controlled, which provides for weighing the detection layer 102 and optical substance 148 after exposure to an amount of particulate matter, and determining a time-based exposure level.

Although the shapes and graphics on the graphical target layer 118 are illustrated and described as comparing particular patterns that transition from a visible image to an invisible image, embodiments contemplate other visually detectable changes, such as the altering of a color, shade, pattern, graphic, text, or the like to indicate exposure to one or more particulate matters and/or a predetermined quantity of one or more particulate matters, according to particular needs. In addition, pores may be disposed within a center of the one or more optical windows 144 provides for viewing the graphical target layer 118 positioned directly behind one or more optical windows 144. According to embodiments, the pores provides a visual contrast with the optical window darkened by adsorption of the particulate matter. The pores may be designed and sized to provide repeatability as well as to show an optical sensitive measurement of the quantity of the particulate matter. In addition, although one or more optical windows are illustrated and shown as the quadrilateral openings, embodiments contemplate optical windows comprising cylinders, cubes, or other two and three-dimensional structures formed from the surface coating of a substrate or the cutting of an optical substance into a form.

A mesh layer 140 provides for calculation of the multiplicative product of length, width, and a saturation coefficient determined for the mesh layer 140. According to an embodiment, a saturation coefficient is determined via air stream testing of manufactured mesh substrates, wherein the saturation coefficient is relative to air contamination and particulate matter adhesion rate.

As described above, the detection layer 102 may comprise a mesh layer 140 coated with the optical substance 148 that adsorbs the particulate matter 112 from the ambient environmental air in the vicinity of the particulate matter detection device 100. In addition, embodiments contemplate designing the particulate matter detection device 100 to discriminate between one or more sizes or compounds present in particulate matter 112, as described in more detail herein. For example, according to one embodiment, the particulate matter detection device 100 is designed to detect exposure to respirable crystalline silica. In addition, embodiments comprise a mesh layer 140 formed of any suitable material, such as a mesh, for example, a wire mesh, a fiberglass mesh, an aluminum mesh, a silicone filament mesh, a plastic filament mesh, or the like. Although the detection layer 102 is illustrated and described as a mesh, embodiments contemplate other suitable substrates, including, for example, a squared off die-cut structure. The mesh layer 140 comprises strands 146 that may overlapping or interlaced to create a surface that is selectively porous to particles based on size. According to embodiments, the mesh layer 140 comprises strands 146 in a first direction (referred to as horizontal strands) perpendicular to strands 146 in a second direction (referred to as vertical strands), with a horizontal spacing between adjacent horizontal strands and a vertical spacing between adjacent vertical strands. Horizontal spacing may be the same as, or different from, the vertical spacing depending on particular needs. According to some embodiments, the mesh layer 140 comprises horizontal strands or vertical strands. Additionally, instead of being perpendicular, horizontal strands may be situated at any angle from vertical strands (such as, for example, 20, 30, 45, 50, 60, 70, 90, or any suitable number of degrees) that form quadrilateral or parallelogram openings. These openings may be substantially uniform and repeated over at least a portion the surface of the mesh layer 140.

The spacing between the strands 146 (as shown in FIG. 4) determines the size of particles that may pass through the mesh layer 140. For example, when the spacing between the strands 146 is 2 mm, particles larger than 2 mm will be blocked from passing through the mesh layer 140. Although the spacing between adjacent strands 146 is described as 2 mm, embodiments contemplate any suitable number or spacing of strands 146 in the mesh layer 140, according to particular needs. Additionally, although the strands 146 in the mesh layer 140 are illustrated as overlapping or interlaced (shown in FIG. 5), according to some embodiments, the mesh layer 140 comprises a net (not shown), wherein the net comprises strands 164 that are twisted or wrapped to form openings in the mesh layer 140. According to other embodiments, the mesh layer 140 comprises a grid (not shown) formed by cutting a solid sheet of material by using, for example, a laser cutter or other tool, to form openings in the mesh layer 140. Although particular types of the mesh are described, embodiments contemplate any suitable mesh, according to particular needs.

Figure 8:
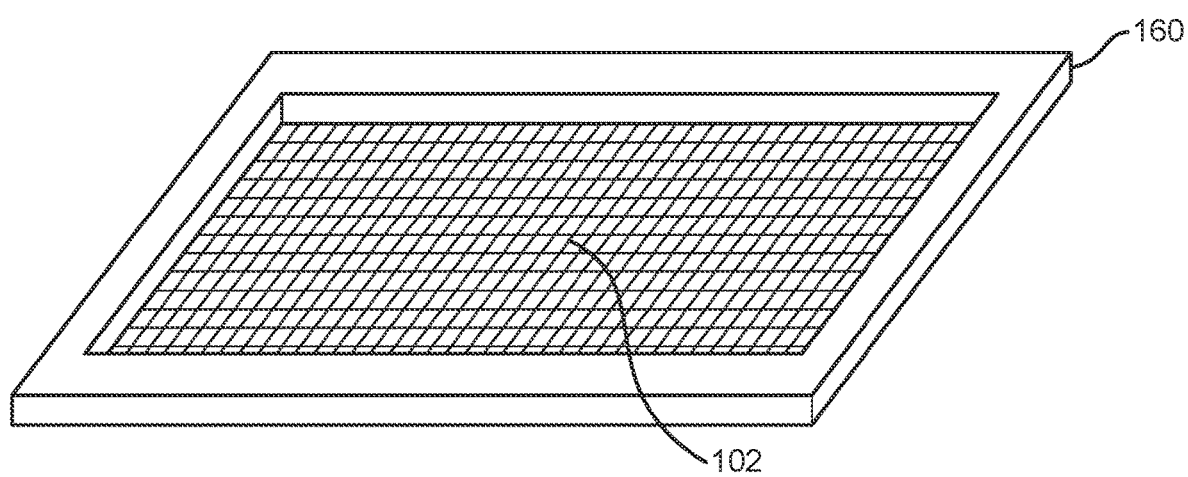
FIG. 8 is a perspective view of a detection layer comprising a rim according to an embodiment of the disclosed subject matter.

Referring to FIG. 8, according to some embodiments of the disclosed subject matter, the detection layer 102 comprises a peripheral rim 160, such as a filament, strand, strip, or other component disposed around the perimeter of the detection layer 102. According to other embodiments, the peripheral rim 160 is not separable from the detection layer 102 by being formed directly from, for example, overlapped, interlaced, or twisted filaments or fibers from the detection layer 102. Regarding construction, the detection layer 102 may be formed from a plurality of individual filaments, one or more of which are joined (e.g., welded, soldered, swaged, woven, or otherwise held in place) to another one or more individual filaments.

Figure 9:
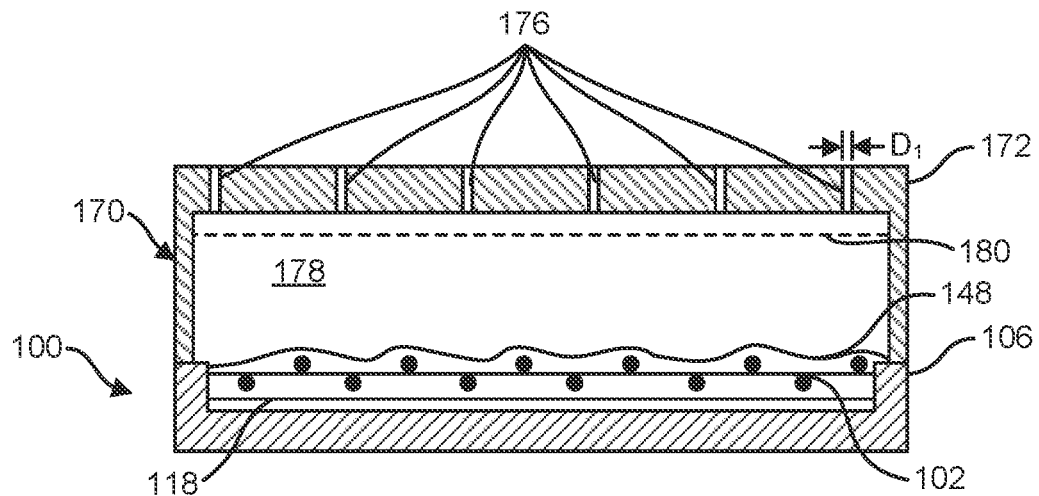
FIG. 9 is a cross-sectional view of a particulate matter detection with a connected channeled air modifier according to an embodiment of the disclosed subject matter.
Figure 10:
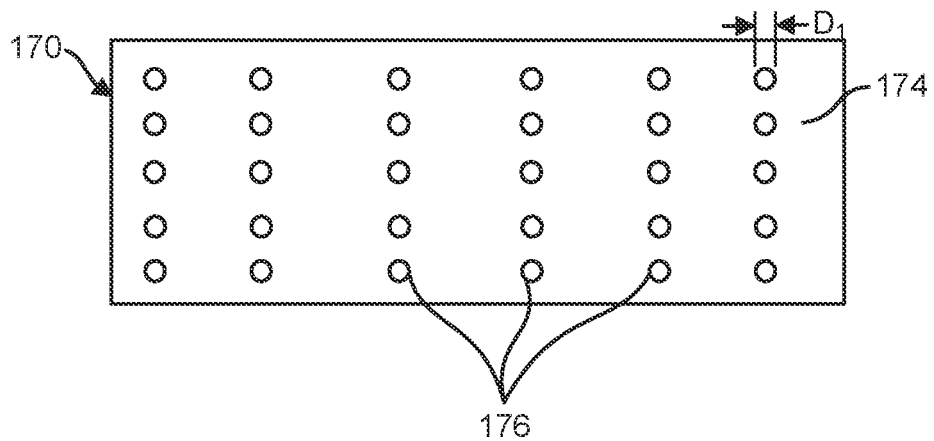
FIG. 10 is a top view of a channeled air modifier according to an embodiment of the disclosed subject matter.

Referring to FIG. 9 and FIG. 10, in an embodiment of the disclosed subject matter, a cross-sectional view and a top view of a channeled air modifier 170 comprises an enclosure 172 that covers the indicator 114 of the particulate matter detection device 100 and comprises a top surface 174 having plurality of holes 176 (e.g. precision-drilled holes) disposed through the top surface 174. According to embodiments, the plurality of holes 176 having a predetermined diameter Di provides size-selective discrimination of dust and other airborne particles, by preventing particles larger than Di from entering into the interior 178 of the enclosure 172 and adsorbing to the optical substance 148. According to particular embodiments, the plurality of holes 176 provide for precision measurements of $PM_{2.5}$ and/or $PM_{10}$) even in heavy concentrated particulate environments. In another embodiment, the channeled air modifier 170 encloses the indicator to exclude non-targeted airborne material, such as, for example, debris, non-respirable dust, liquids, or other undesired materials. Embodiments contemplate the channeled air modifier 170 used in environmental conditions or tasks that generate significant amounts of airborne non-targeted or non-respirable debris to prevent premature fouling of the indicator 114, incorrect readings, or the like. Further embodiments may include additionally, or in the alternative, a prescreen 180 that discriminates larger particles from reaching the indicator 114. When the particulate matter detection device 100 is near a construction task that produces an excessive amount of non-respirable dust and debris, the prescreen 180, a channeled air modifier 170, and/or one or more additional screens may be placed above the optical substance 148 with a designed size and shape that allows detection of targeted particles, while preventing large particles from fouling the indicator 114. Notably, although a prescreen 180 or channeled air modifier 170 may prevent particles larger than a particular size form adsorbing on the optical substance 148, the composition of the particulate matter 112 may comprise silica as the major constituent of dust produced by construction industry tasks, however, cellulose and other particles sized similar to the detected silica would also be detected, absent one or more additional modifications.

Figure 11:
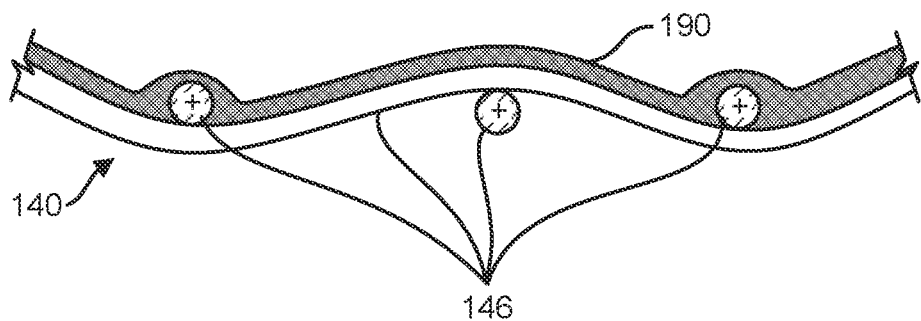
FIG. 11 is a cross-sectional view of a detection layer and optical substance according to an embodiment of the disclosed subject matter.

Referring to FIG. 11, in an embodiment of the disclosed subject matter, a mesh layer 140 comprises a coating 190 of poly-siloxane gel. Poly-siloxane gel is often referred to as silicone gel, or simply, silicone. The properties of silicone are controlled by directed modifications to the sidechains of siloxane monomers, the relative concentrations of cross-linkers to monomers, layered application of different batches, and coatings, pigments, and other additives. Although a particular silicone gel has been selected, embodiments of the disclosed subject matter contemplate altering the silicone gel coating or replacing the silicone gel coating with another gel or rubber having similar or better adsorption rheology for adsorbing silica dust or other airborne particulate matter. According to an embodiment, the silicone gel comprises WACKER SilGel® 612 A/B silicone gel, which comprises RTV-2 silicone rubber that vulcanizes at room temperature to form a soft silicone gel. According to embodiments, the silicone gel the hardness and rheology of the silicone gel may be controlled by varying the ratio a first substance comprising the monomer and cross-linker, and a second substance comprising the monomer and catalyst. In addition, pigmentation of the silicone gel may be achieved by addition of 1-4% of an ELASTOSIL® FL pigment paste. In some embodiments, airborne silica is adsorbed to the surface of the poly-siloxane gel and accumulates around the optical window in a sufficient amount to at least partially obscure the upper surface of the target layer. The color indicator, discussed above, was described as one type of target. However, embodiments may comprise the target includes tinting the siloxane, or adding color. Currently the color of the silica dust contrasts with graphical target layer 118 behind the detection layer 102. The graphical target layer 118 may comprise a colored surface or a patterned surface to contrast against the detection layer 102 when viewed through the one or more optical windows 144.

As described above, each of the strands 146 of the mesh layer 140, illustrated in FIG. 11, comprise a coating 190 of silicone gel. The geometry of the mesh layer 140 provides for adding a coating 190 having a large surface area to adsorb particulate matter and increasing the amount of visibility of optical change in response to exposure of particulate matter. As discussed above, the strands 146 of the mesh layer 140 are less consistent than would be desired to perform precise gravimetric analysis. Accordingly embodiments contemplate a die-cut substrate and/or a die-cut silicone gel to provide a particulate matter collection medium having a pre-defined weight and allowing for gravimetric calculation of precise exposure levels to particulate matter.

Embodiments additionally contemplate precision calculation of silica exposure comprising gravimetric (weight) based detection, thermos-gravimetric (consuming the optical substance with heat), or X-ray diffraction. But these calculations require expensive equipment. One problem is extrapolating a small amount of exposure of the surface area of the optical substance to a much larger environment around an individual. In addition, one or more individuals may turn in their indicator layers at the end of the shift, and an optical imaging device reads the amount of silica adsorbed to the surface of the optical substance. In addition, altering the rheology across different parts of the detection layer provides detection of different particle sizes, different types or shapes of particles, different compounds, according to particular needs.

Figure 12:
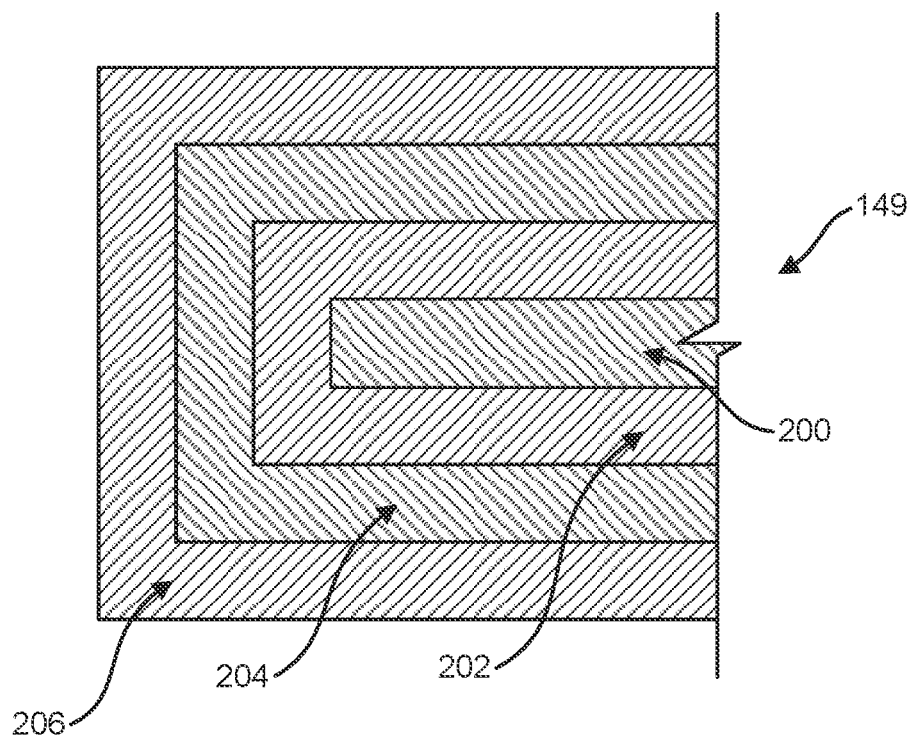
FIG. 12 is a cross-sectional view of a mesh substrate fiber according to an embodiment of the disclosed subject matter.

Referring to FIG. 12, in an embodiment of the disclosed subject matter, a mesh substrate fiber 149 of the mesh layer 140 is coated with multiple functional layers. The innermost portion comprises a flat substrate 200 such as, for example, a die-cut substrate. The flat substrate 200 may be coated by a primer layer 202 comprising a primer and comprising an interface to allow the first layer 204 to adhere to the flat substrate 200. The first layer 204 comprises a silicone gel with a first ratio of components and a first viscosity, while a second layer 206 may comprise a second ratio of components and having second viscosity, wherein the different rheological properties of the first layer 204 and second layer 206 provides for engulfment and adsorption of a greater number of particulate matter than a dual-layered coating of the same thickness, but comprising two coatings of a silicone with the same ratio of components. The substrate and/or the mesh fibers comprise one or more applications of a coating of the optical substance to increase the adhesion of inert particulate matter by providing one or more non-chemical surface characteristics, such as, for example, an interior charge different from the surface charge, a charge differential formulated to improve adhesion of airborne particles to optical substance by changing the characteristics of absorption of the air around optical substance.

The silica adsorbs to the optical substance and changes the optical properties of the optical substance, such as siloxane. Additional silica will continue to adsorb onto the surface of the optical substance and providing a graduated level of absorption or entrapment into the silicone gel. When particulate matter is deposited onto the surface, the silica particle is pulled into the volume of the silicone gel. The fixotropic behavior or the rheology of the different layers of silicone gel provides for modification of the rate of which the particulate matter is adsorbed into the mass of the silicone gel. In addition, physical properties of the substrate may be altered for increased ingestion of silica particles by a surface statically-charged coating on the substrate. The multiple coatings can create an electrostatic change between layers which alters the characteristics of capture of particles from the around the layered substrate.

Figure 13:
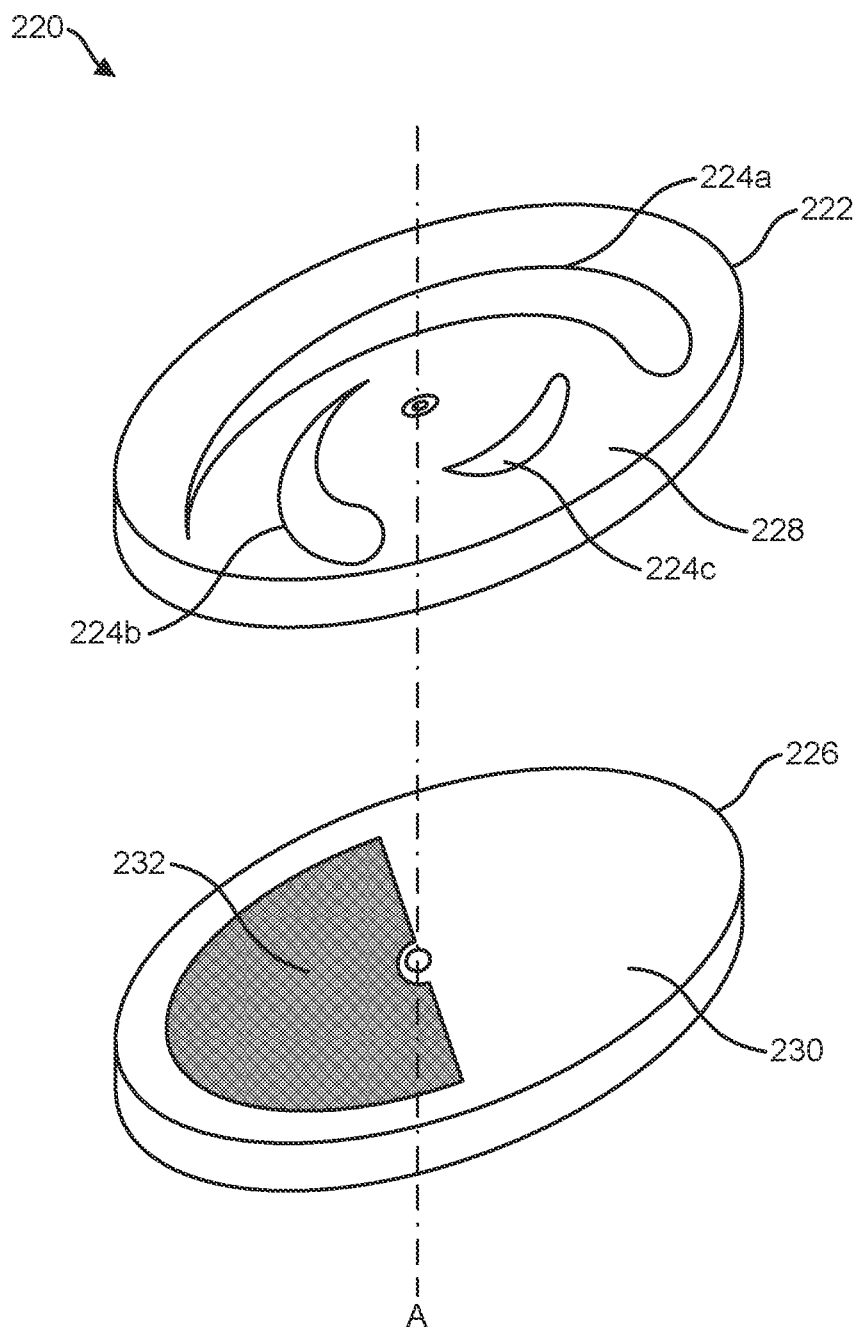
FIG. 13 is a perspective view of a rotary variable aperture member according to an embodiment of the disclosed subject matter.

Referring to FIG. 13, in an embodiment of the disclosed subject matter, a rotary variable aperture member 220 for precision measurement of particulate matter comprises an adjustable aperture dial 222 having at least one variable width aperture 224a,b,c; and a lower planar member 226 rotatably connected to the adjustable aperture dial 222 at a central axis A.

A first top surface 228 of the adjustable aperture dial 222 is bonded with an optical substance (not shown) spanning the width of the at least one variable width aperture 224a,b,c, and responsive to particulate matter. In an embodiment, the optical substance comprises one of a poly-siloxane gel, rubber, gel, polymer, or resin having an affinity to a particulate matter. The optical substance forms one or more optical windows bounded by the at least one variable width aperture 224a,b,c, the optical substance configured to adsorb a particulate matter and occlude the one or more optical windows.

When the optical substance is exposed to particulate matter, the change in visual appearance of the optical substance occludes the width of at least one variable width aperture 224a,b,c, thereby providing an indication of the gradation of the particle size of the particulate matter in the environment, as well as providing an indication of exposure time of the indicator to the particulate matter. In an embodiment of the disclosed subject matter, the at least one variable width aperture 224a,b,c is configured to correspond to a particle size of a particulate matter (e.g., $PM_{2.5}$ and $PM_{10}$).

The lower planar member 226 comprises a second top surface 230 and a graphic 232 disposed thereon. Prior to adsorption of the particulate matter to the optical substance, the graphic 232 is visible through the at least one variable width aperture 224 depending on the orientation of the adjustable aperture dial 222 with the lower planar member 226. In an embodiment, the graphic 232 comprises a color or a pattern printed on a predetermined area of the second top surface 230. The adjustable aperture dial 222 is rotated along the central axis A to a predetermined position in order to view the graphic 232 through the at least one variable width aperture 224a,b,c.

In an embodiment of the disclosed subject matter, an electronic device, such as smart phone, may be employed to take a photo or video of the graphical target layer 118 though the one or more optical windows 144 and store the photo or video within a memory of the smart phone or transmit the photo to a remote storage location. A series of photos or videos may be utilized to detect a change in the transparency of the optical substance over time. In an embodiment, the photo or video is displayed onto an electronic device such a heads-up-display (HUD), a smart phone, a smart watch, or other electronic display to indicate one of a current exposure level or a maximum exposure level. In an embodiment, one or more mirrors may reflect a view of the graphical target layer 118 though the one or more optical windows 144 to an individual.

In addition, embodiments of indicator include a high efficiency particulate (HEPA) filter change indicator for fouling of excess particulate matter. Embodiments of the optical substance attached to a substrate may also comprise an indicator for replacement of a filter cartridge. Further embodiments integrate optical windows into an air filter and shut off when the visual detector indicates that a certain exposure is reached. This may require replacement of the air filter, individuals to leave the environment, a predetermined amount of time to elapse, and the like. In addition, embodiments of the one or more optical windows may adsorb and block light, creating a signal which may be detected by one or more electronic devices to, for example, automatically turn off the tool or appliance, such as a vacuum, when an exposure reaches the PEL, the action level, or another predetermined amount.

In an embodiment of the disclosed subject matter, a method of detecting particulate matter may comprise the steps of: (1) providing an indicator comprising: a detection layer comprising: a detection layer surface; and one or more apertures disposed through the detection layer surface; an optical substance bonded to the detection layer surface, the optical substance forming one or more optical windows bounded by the one or more apertures, the optical substance configured to adsorb a particulate matter; and a graphical target layer viewable through the one or more optical windows; (2) adsorbing the particulate matter onto the optical substance; and (3) obscuring the graphical target layer as viewed through the one or more optical windows.

The method of detecting particulate matter may further comprise the steps of connecting the indicator to a support frame having a sealed membrane; and removing the sealed membrane from the support frame prior to the adsorbing step. The method of detecting particulate matter may further comprise the step of connecting the support frame to one of an individual or an attachment surface prior to the adsorbing step. The method of detecting particulate matter may further comprise the step of demounting the indicator from the support frame after the adsorbing step.

The materials used for implementations of particulate matter detection device assemblies may be made of conventional materials used to make goods similar to these in the art, such as, by non-limiting example, plastics, polycarbonates, polyesters, acrylics, Teflon®, rubbers, metals, composites, ceramics, glass, and the like. Those of ordinary skill in the art will readily be able to select appropriate materials and manufacture these products from the disclosures provided herein.

Although the connection and fastening means described with respect to the particulate matter detection device 100 have been described, embodiments contemplate any suitable coupling of components such as with adhesive, a weld joint, a solder joint, a fastener (e.g. a bolt and a nut, a screw, a rivet, a pin, and/or the like), washers, retainers, wrapping, wiring, and any combination of the foregoing. Additionally, although features of the particulate matter detection device 100 are described as being separable, embodiments contemplate any feature being composed of more than one piece or multiple features being combined into a single piece, according to particular needs.

Although specific materials for each of the features of the present disclosure have been presented, embodiments contemplate various types of materials or combinations thereof that can readily be formed into shaped objects provided that the materials selected are consistent with the intended operation of the particulate matter detection device. For example, the components may be formed of: rubbers (synthetic and/or natural); polymers, such as thermoplastics and thermosets; composites, such as carbon-fiber; metals; alloys; any other suitable material; and/or any combination of the foregoing.

Reference in the foregoing specification to "one embodiment", "an embodiment", or "another embodiment" means that a particular feature, structure, or characteristic described in connection with the embodiment is included in at least one embodiment of the disclosed subject matter. The appearances of the phrase "in one embodiment" in various places in the specification are not necessarily all referring to the same embodiment.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

The detailed description includes the disclosure of numerical ranges. Numerical ranges should be construed to provide literal support for claim limitations reciting only the upper vale of a numerical range, and provide literal support for claim limitations reciting only the lower value of a numerical range.

Certain terminology will be used in the following description, and are shown in the drawings, and will not be limiting. For example, "up," "down," "front," "back," "right" and "left" refer to the disclosed subject matter as orientated in the view being referred to. The words, "inwardly" and "outwardly" refer to directions toward and away from, respectively, the geometric center of the aspect being described and designated parts thereof. "Forwardly" and "rearwardly" are generally in reference to the direction of travel, if appropriate. Said terminology will include the words specifically mentioned, derivatives thereof and words of similar meaning.

Having described the disclosed subject matter, what is claimed as new and desired to be secured by Letters Patent is:

1. A particulate matter detection device, comprising:
   an indicator comprising:
      a detection layer comprising:
         a detection layer surface; and
         one or more apertures disposed through the detection layer surface;
      an optical substance bonded to the detection layer surface, the optical substance forming one or more optical windows bounded by the one or more apertures, the optical substance configured to adsorb a particulate matter; and
      a graphical target layer viewable through the one or more optical windows,
   whereby adsorption of the particulate matter to the optical substance obscures the graphical target layer as viewed through the one or more optical windows.

2. The particulate matter detection device of claim 1, wherein the particulate matter is silica dust.

3. The particulate matter detection device of claim 1, wherein the optical substance has an affinity to the particulate matter, wherein the optical substance is one of a poly-siloxane gel, a rubber, a gel, a polymer, or a resin.

4. The particulate matter detection device of claim 1, wherein the detection layer is a mesh layer.

5. The particulate matter detection device of claim 1, wherein the graphical target layer comprises a grid pattern.

6. The particulate matter detection device of claim 1, further comprising a support frame demountably connected to the detection layer.

7. The particulate matter detection device of claim 6, further comprising a sealed membrane demountably connected to the support frame, wherein the sealed membrane is configured to enclose the indicator within the support frame.

8. The particulate matter detection device of claim 6, further comprising a channeled air modifier connected to the support frame, the channeled air modifier comprising a top surface having a plurality of holes, wherein the indicator is enclosed within the support frame and the channeled air modifier.

9. The particulate matter detection device of claim 8, further comprising a prescreen disposed between the plurality of holes and the optical substance.

10. The particulate matter detection device of claim 1, wherein a change of transparency of the optical substance indicates a gradation of exposure of the indicator to the particulate matter.

11. The particulate matter detection device of claim 1, wherein the graphical target layer comprises one of a colored surface or patterned surface.

12. A particulate matter detection device, comprising:
   an indicator comprising:
      a detection layer comprising:
         a detection layer surface; and
         one or more apertures disposed through the detection layer surface;
      an optical substance bonded to the detection layer surface, the optical substance forming one or more optical windows bounded by the one or more apertures, the optical substance configured to adsorb a particulate matter; and a graphical target layer viewable through the one or more optical windows, whereby adsorption of the particulate matter to the optical substance obscures the graphical target layer as viewed through the one or more optical windows;

a support frame comprising one or more first fasteners, wherein the indicator is demountably connected to the support frame by the one or more first fasteners;

one or more second fasteners connected to the support frame; and a sealed membrane connected to the support frame, wherein the sealed membrane is configured to enclose the indicator within the support frame.

13. A method of detecting particulate matter, comprising the steps of:

providing an indicator comprising:
a detection layer comprising:
a detection layer surface; and
one or more apertures disposed through the detection layer surface;
an optical substance bonded to the detection layer surface, the optical substance forming one or more optical windows bounded by the one or more apertures, the optical substance configured to adsorb a particulate matter; and
a graphical target layer viewable through the one or more optical windows;

adsorbing the particulate matter onto the optical substance; and obscuring the graphical target layer as viewed through the one or more optical windows.

14. The method of detecting particulate matter according to claim 13, the method further comprises the steps of:

connecting the indicator to a support frame having a sealed membrane; and removing the sealed membrane from the support frame prior to the adsorbing step.

15. The method of detecting particulate matter according to claim 14, further comprising the step of connecting the support frame to one of an individual or an attachment surface prior to the adsorbing step.

16. The method of detecting particulate matter according to claim 14, further comprising the step of demounting the indicator from the support frame after the adsorbing step.

* * * * *

UNITED STATES PATENT AND TRADEMARK OFFICE
CERTIFICATE OF CORRECTION

| | | |
|---|---|---|
| PATENT NO. | : 12,416,582 B2 | Page 1 of 1 |
| APPLICATION NO. | : 17/651172 | |
| DATED | : September 16, 2025 | |
| INVENTOR(S) | : Christopher Lee Boortz | |

It is certified that error appears in the above-identified patent and that said Letters Patent is hereby corrected as shown below:

In the Specification

In Column 9, Lines 39 and 41, change the "Di" to $D_1$.

Signed and Sealed this
Eleventh Day of November, 2025

John A. Squires
*Director of the United States Patent and Trademark Office*